United States Patent [19]
Roussin

[11] 3,946,154
[45] Mar. 23, 1976

[54] REDUCED INITIAL DELAY IN PROJECTING HIGH QUALITY IMAGES FROM A FLUID LIGHT VALVE

[75] Inventor: Alfred G. Roussin, Syracuse, N.Y.

[73] Assignee: General Electric Company, Portsmouth, Va.

[22] Filed: Mar. 22, 1974

[21] Appl. No.: 453,779

[52] U.S. Cl. .......................................... 178/7.5 D
[51] Int. Cl.² ...................................... H04N 3/16
[58] Field of Search ..................... 178/7.5 D; 358/62

[56] References Cited
UNITED STATES PATENTS

| | | | |
|---|---|---|---|
| 3,155,871 | 11/1964 | Good et al. | 178/7.5 D |
| 3,164,671 | 1/1965 | Schilling | 178/7.5 D |
| 3,250,948 | 5/1966 | True | 178/7.5 D |
| 3,325,592 | 6/1967 | Good et al. | 358/62 |
| 3,489,941 | 1/1970 | Towlson | 178/7.5 D |

Primary Examiner—Albert J. Mayer

[57] ABSTRACT

Elapsed time from turn-on of a fluid light valve to the time when the initial, turbulent fluid has settled to a quiescent condition on which a noise free image may be inscribed by an electron beam is reduced by expanding vertical sweep size of the raster, expanding horizontal sweep size of the raster, or reducing electron beam current. These operations, which may be controlled individually or in combination during the turn-on period, sweep out excess fluid from the raster area to ensure that fluid depth is adjusted to less than critical depth over the entire desired raster area so as to establish a smooth and uniform fluid surface by the time the turn-on sequence has been completed.

24 Claims, 5 Drawing Figures

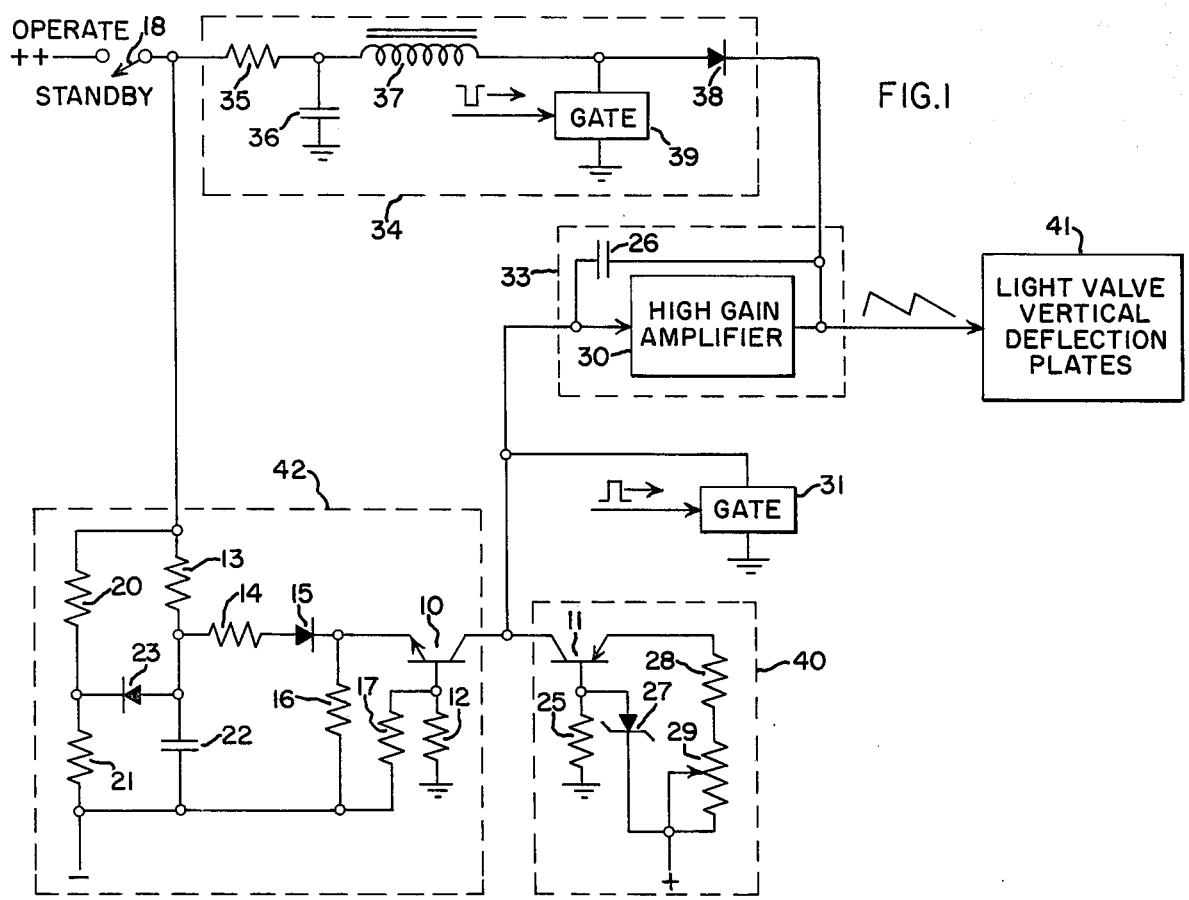
FIG.1
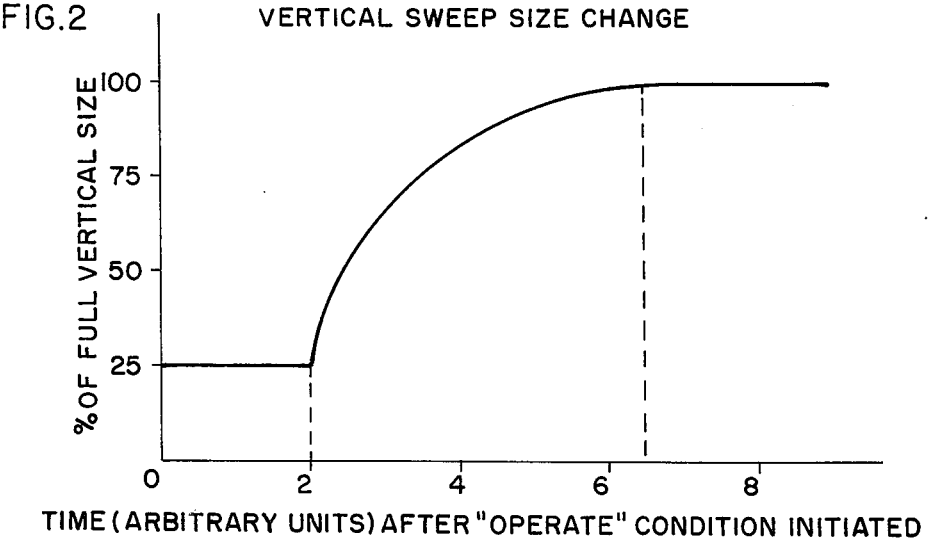
FIG.2 VERTICAL SWEEP SIZE CHANGE
TIME (ARBITRARY UNITS) AFTER "OPERATE" CONDITION INITIATED

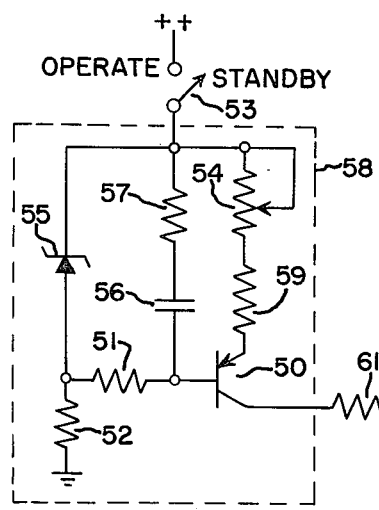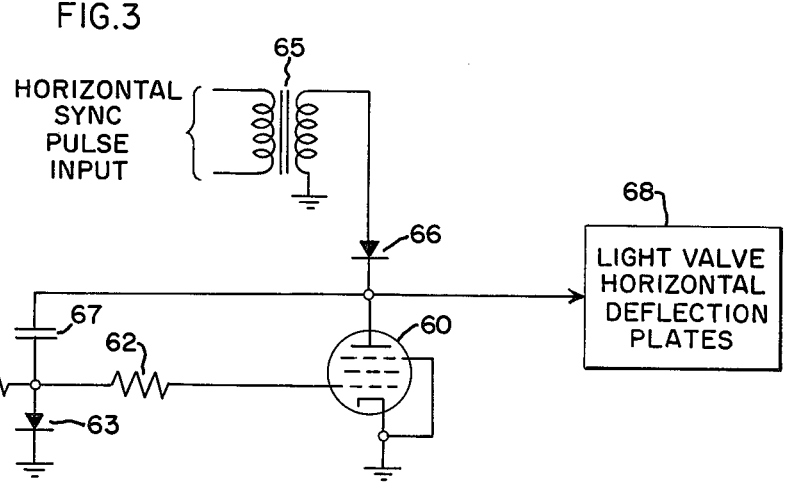
FIG.3
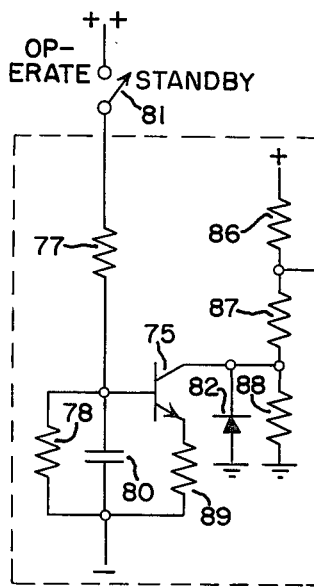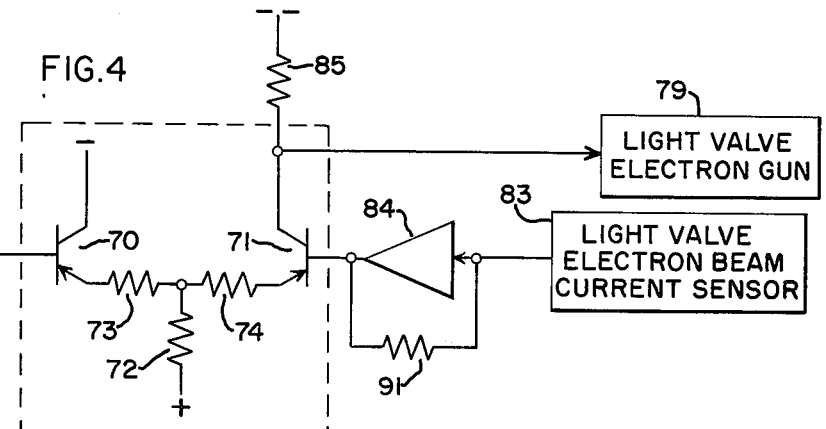
FIG.4
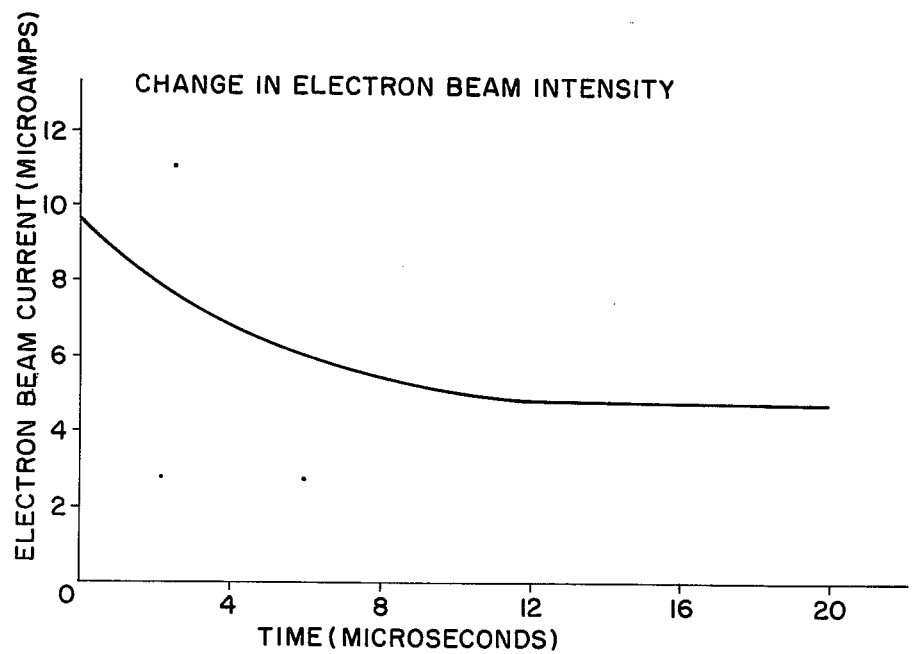
FIG.5

REDUCED INITIAL DELAY IN PROJECTING HIGH QUALITY IMAGES FROM A FLUID LIGHT VALVE

INTRODUCTION

This invention relates to light valves for optically projecting images generated electronically on a light-controlling fluid layer, and more particularly to a method and apparatus for reducing delay in ability to begin projecting high quality images from the fluid layer.

One form of light valve suitable for optical projection of electronically generated images onto a remote display surface comprises an evacuated enclosure containing an electron gun in predetermined alignment with a transparent disk. The disk is slowly rotated through a reservoir of light modulating fluid to deposit a continously-replenished layer of fluid on the disk surface. An electron beam, generated by the electron gun, is directed through beam deflecting and focusing means and is scanned across a portion of the light modulating fluid layer so as to selectively deform the layer. The fluid deformations thus formed constitute optical diffraction gratings which, in conjunction with a Schlieren optical system, selectively control passage from a light source through the disk and through an output window in the enclosure envelope in order to create visible images at the remote display surface on which the light impinges. A system of this type is described and claimed in W. E. Good et al. U.S. Pat. No. 3,325,592, issued June 13, 1967 and assigned to the instant assignee.

In a typical light valve, with the electron beam turned off, depth of the fluid layer on the disk is 50 microns. There exists, however, a "critical depth", which may be defined as a fluid depth above which turbulent breakup of the fluid surface occurs, impairing the image or creating a "noisy" image. Operation of the light valve when the fluid layer depth exceeds the critical depth produces a churning surface of nonuniformly undulating topography, which diffracts and refracts light through the Schlieren optical system onto the screen. A very bright display replete with random disturbances is thus produced on the screen, and the intensity of such spurious display is sufficient to override and obscure or completely obliterate the desired video information.

To avoid such loss of information, light valves have heretofore typically employed the electron beam therein to impinge upon fluid flowing toward the raster and electrostatically regulate the level of such incoming fluid to a depth below the critical depth. When thus regulated, the surface of the fluid on which charge patterns are to be deposited by the electron beam becomes uniformly calm and smooth.

In the system sometimes referred to as an "electronic dam", described and claimed in W. E. Good et al. U.S. Pat. No. 3,155,871, issued Nov. 3, 1964 and assigned to the instant assignee, the active area (i.e. area on which the raster is generated) of the light modulating medium is scanned by the light valve electron beam in a manner to cause an increase in charge density deposited on the medium at the initiation of each horizontal scan line. This is achieved by increasing electron beam current intensity at one end of the horizontal retrace period. The increased charged density forms an electrostatic field at the vertical leading edge of the raster which causes most of the incoming fluid flowing toward the raster to flow to either side of the raster and allows only a thin layer of fluid, less than the critical depth in thickness, to continue into the raster.

Additional control on current density of the electron beam as described in the aforementioned Good et al. patent may be applied in accordance with the teachings of T. T. True U.S Pat. No. 3,250,948, issued May 10, 1966 and assigned to the instant assignee. The invention of the True patent permits deposition of a precise amount of charge on the fluid over a precise time interval, so as to optimize the smoothing and leveling effect such charge has on the fluid modulating medium without compromising uniformity of beam current during the trace interval.

The inventions of the latter two patents provide for display of high quality images, therefore, by utilizing the electron beam at the raster edge to meet incoming fluid and electrostatically regulate the incoming fluid depth to a level below the critical depth. Hence the period of time required to regulate the fluid depth to the proper level over the entire width of the raster is dependent on disk rotational velocity. In a typical light valve, the raster width and rotational velocity combine to produce a suitable surface for display of high quality images in approximately 4.5 minutes after the electron beam is turned on. For some applications, however, 4.5 minutes of waiting time to obtain a high quality image over the entire raster area constitutes an undesirably lengthy operational delay.

Accordingly, one object of the invention is to provide a fluid light valve having a shortened interval between the time when the light valve electron beam is turned on and the time when high quality images may first be displayed by the light valve.

Another object is to provide a method and apparatus for controllably expanding vertical sweep size of the raster in a fluid light valve from the time the light valve electron beam is turned on in order to establish a smooth and uniform fluid surface quickly over the total raster area.

Another object is to provide a method and apparatus for controllably expanding horizontal sweep size of the raster in a fluid light valve from the time the electron beam of light valve is turned on in order to establish a smooth and uniform fluid surface quickly over the total raster area.

Another object is to provide a method and apparatus for controllably altering electron beam current in a fluid light valve from the time the light valve electron beam is turned on in order to establish a smooth and uniform fluid surface quickly over the total raster area.

Briefly, in accordance with a preferred embodiment of the invention, an optical projection system is described wherein an electron beam impinges on a light-modulating fluid medium. The electron beam is deflected over the surface of the medium in raster fashion in accordance with a signal so as to modulate the medium as by forming optical diffraction gratings on the medium representing the image to be displayed by projecting light on the medium. Apparatus is provided for quieting turbulence of the medium so as to render the surface of the medium uniformly calm and smooth, and comprises electron beam generating means for generating the beam with controllable intensity, and means coupled to the electron beam generating means for decreasing electron beam current at a controlled time rate until modulation of the medium has decreased to a predetermined operating level.

In accordance with another preferred embodiment of the invention, an optical projection system is described wherein an electron beam impinges on a light-modulating fluid medium. The electron beam is deflected over the surface of the medium in accordance with a signal so as to modulate the medium to control light energy directed upon the medium. Apparatus is provided for quieting turbulence of the medium so as to render the surface of the medium uniformly calm and smooth, and comprises electron beam deflection means for sweeping the beam over the medium in a raster of size controllable between a predetermined operating size and a smaller initial size, and means coupled to the electron beam deflection means for expanding the raster from the initial size at a controlled time rate by enlarging the sweep of the beam at the controlled time rate until the raster has increased to the predetermined operating size.

In accordance with another preferred embodiment of the invention, an optical projection system is described wherein an electron beam impinges on a light-modulating fluid medium, the electron beam being deflected over the surface of the medium in accordance with a signal so as to modulate the medium to control light energy directed upon the medium. A method for reducing turbulence of the medium so as to render the surface of the medium uniformly calm and smooth with minimum delay comprises altering, at a controlled time rate, the extent of modulation of the medium by the electron beam until the modulation has reached a predetermined extent.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a schematic diagram of a first embodiment of the invention, wherein vertical sweep size of a raster generated in a light valve is controlled;

FIG. 2 is a graphical illustration of typical performance by the apparatus of FIG. 1;

FIG. 3 is a schematic diagram of a second embodiment of the invention, wherein horizontal sweep size of a raster generated in a light valve is controlled;

FIG. 4 is a schematic diagram of a third embodiment of the invention, wherein electron beam current amplitude in a light valve is controlled; and FIG. 5 is a graphical illustration of performance by the apparatus of FIG. 4.

DESCRIPTION OF TYPICAL EMBODIMENTS

In FIG. 1, apparatus for controlling the rate of vertical sweep expansion within a light valve is illustrated. This apparatus comprises first and second transistors 10 and 11 of the NPN and PNP types, respectively, having their collector electrodes connected to each other. A timing circuit 42 includes transistor 10 having a base bias resistance 12 connected between the base electrode of transistor 10 and ground. The emitter electrode of transistor 10 receives positive voltage from a switch 18, when in the "operate" position, through a series combination of resistances 13 and 14 and diode 15, with the diode cathode connected to the emitter electrode of transistor 10. A negative potential is applied to the cathode of diode 15 through an emitter bias resistance 16 and to the base of transistor 10 through a base bias resistance 17. A pair of resistances 20 and 21 are connected in series between the negative potential and switch 18, while a capacitance 22 is connected between the negative potential and the junction of resistances 13 and 14. A diode 23 has its anode connected to the junction of resistances 13 and 14 and its cathode connected to the junction of resistances 20 and 21.

A constant current generator 40 includes transistor 11 having its base electrode grounded through a base bias resistance 25 and connected to a source of low amplitude positive voltage through a reverse-biased zener diode 27. The emitter electrode of transistor 11 is connected to the source of low amplitude positive voltage through a resistance 28 in series with a potentiometer 29 having a controllable portion thereof short-circuited. Once a setting on potentiometer 29 has been established, the collector electrode of transistor 11 functions as the output of constant current generator 40.

The collector electrodes of transistors 10 and 11 are connected to one side of integrating capacitance 26. This capacitance is employed in a feedback path about a high gain amplifier 30 which, in combination with capacitance 26, comprises a Miller integrator circuit 33 of the type shown and described in section 18-12 of F. E. Terman, *Electronic and Radio Engineering*, fourth edition, McGraw-Hill, 1955, and on pages 11–8 and 11–9 of R. W. Landee et al., *Electronic Designers' Handbook*, McGraw-Hill, 1957. The output of Miller integrator circuit 33 drives the light valve vertical deflection plates 41 for vertically deflecting the electron beam within the light valve. A gate circuit 31, triggered by a positive-going pulse coincident with the vertical retrace pulse, essentially connects the collectors of transistors 10 and 11 to ground during the vertical retrace interval. During vertical sweep or trace, however, gate 31 is nonconductive.

High voltage direct current is supplied from a high voltage power supply 34 to the output of amplifier 30. Input voltage to power supply 34 is furnished from switch 18 through a current limiting resistance 35 so as to charge a storage capacitance 36. An inductance 37, and a diode 38 poled in the forward direction, are connected in series with resistance 35 and capacitance 26. A gate circuit 39, triggered by a negative pulse coincident with the vertical retrace pulse, is connected between the junction of inductance 37 and diode 38, and ground.

When the light valve is in standby operation, the electron beam is off, the electron acceleration fields of the light valve are off, and the focus and deflection fields of the light valve are also off. The disk carrying the fluid layer is rotated through a reservoir of fluid so as to remain coated with fluid. This coating is often described as being of a turbulent nature at this time, and is therefore not amenable to orderly production of diffraction gratings thereon. Switch 18 is in the "standby" position, leaving zero voltage across capacitance 22 due to the discharge path through diode 23 and resistance 21. A second discharge path for capacitance 22 is provided by resistances 13, 20 and 21 in series, and a third discharge path is provided by resistance 14, diode 15 and resistance 16 in series. The emitter electrode of transistor 10 is negatively-biased through resistance 16, thus causing transistor 10 to conduct at a collector current value determined by the sizes of resistances 16, 17 and 12, and the negative supply voltage.

In normal operation, Miller integrator 33 provides vertical trace pulses, in the form of sawtooth waves, to the light valve vertical deflection plates 41. These sawtooth waves are generated when switch 18 is in the "operate" position, so that capacitance 36 is fully charged. The time required for capacitance 36 to charge is relatively short, due to the low time constant resulting from resistance 35 being of relatively low ohmic value. Hence, very shortly after switch 18 is actuated to the "operate" position, capacitance 36 is fully charged. Gate 39 is conductive in absence of a negative input signal. Thus, during each vertical retrace interval, the ground connection to one side of choke 37 is removed by gate circuit 39 being rendered nonconductive by a negative input pulse. Gate 31 is nonconductive in the absence of a positive input signal so that, during the vertical retrace interval, the input to Miller integrator circuit 33 is connected to ground through gate circuit 31.

During each vertical retrace interval, interruption of the heavy current flow through inductance 37 and gate 39 in series induces a high potential on the inductor at its connection to the anode of diode 38. Charge stored on capacitance 36 contributes to generation of the high potential by permitting a lower maximum current capability of the positive bias supply. The high voltage induced at the anode of diode 38 is thus applied across capacitance 26 by current flow through the diode in series with conductive gate 31. Upon termination of the vertical retrace interval, gate 39 again becomes conductive and gate 31 again becomes nonconductive. A large charge thus remains stored on capacitance 26, so that a large output voltage is produced by Miller integrator circuit 33 at the start of the vertical trace interval. No further high voltage pulse is furnished to capacitance 26 from inductance 37 until start of the next vertical retrace interval.

At start of the vertical trace interval, capacitance 26 applies a large negative voltage to the input of amplifier 30, which is of the inverting type. However, the input of amplifier 30 also receives current from constant current generator 40. This constant current arises since constant base bias is maintained on transistor 11 by the voltage drop across back-biased zener diode 27, which maintains a constant voltage across resistance 25. Typical of junction transistors, emitter-to-base voltage on transistor 10 is constant for any given setting of potentiometer 29. Varying the setting of potentiometer 29 simply varies the resistance of the emitter circuit to establish another desired level of constant collector current through transistor 11.

Current furnished by constant current generator 40 reduces voltage stored on capacitance 26 at a rate determined by the current amplitude supplied to Miller integrator 33. By thus reducing amplitude of negative voltage at the input to amplifier 30, output voltage produced by amplifier 30 is reduced proportionately. By proper control of current supplied to amplifier 30, minimum output voltage of amplifier 30, occuring precisely at the instant that the next vertical sweep retrace interval is to be initiated, may gradually be reduced to the level that produces rasters of normal vertical height; that is, the vertical sweep voltage excursions are produced between gradually increasing or widening amplitude limits.

In order to control vertical sweep size and hence vertical raster size when operation of the light valve is initiated, timing circuit 42 is employed to draw current to controllable amplitude from the current produced by constant current generator 40. Control of current drawn from constant current generator 40 is achieved by controlling emitter voltage on transistor 10. A positive-going change in emitter voltage renders transistor 10 less conductive and a negative-going change in emitter voltage renders the transistor more conductive.

Specifically, when switch 18 is actuated into the "operate" position, capacitance 22 charges at a rate determined primarily by the sizes of capacitance 22, resistance 13 and voltage supplied by switch 18. Diode 23 essentially prevents resistance 20 from reducing the charging time constant of capacitance 22 because, during charging of capacitance 22, the diode is reverse-biased and hence in its high resistance condition. In addition, the emitter of transistor 10 becomes biased slightly positive, due to voltage drop caused by current flow from switch 18 through resistors 13 and 14, diode 15 and resistor 16. Voltage on capacitance 22, however, has no effect on collector-to-emitter current flow through transistor 10 until it has risen in amplitude above the positive voltage at the cathode of diode 15 so as to forward bias the diode. The charging time constant for capacitance 22 is thus selected to provide a typical interval of about 20 seconds after switch 18 has been actuated into the "operate" position before conduction of transistor 10 is affected thereby.

As voltage amplitude on capacitance 22 continues to increase, driving the anode of diode 15 increasingly positive, current flow through resistance 16 increases. As a result, emitter voltage on transistor 10 moves in a positive direction, rendering the transistor progressively less conductive. Consequently, transistor 10 draws less current through its collector from transistor 11, thereby causing an increase in amplitude of current furnished from constant current generator 40 to Miller integrator 33. This increased current flow to integrator 33 causes capacitance 26 to discharge at a more rapid rate during each vertical trace interval, thereby increasing steepness or slope of the sawtooth waves furnished by the integrator to light valve vertical deflection plates 41. This increasing steepness results in a widening vertical sweep which progressively increases until voltage on capacitance 22 is of sufficiently large amplitude to drive transistor 10 substantially out of conduction. When this condition is reached, the vertical sweep is at its full size. Typical elapsed time between the initial increase in vertical sweep size and the vertical sweep size reaching its full value may be about 45 seconds. Thus the interval allowed for the light valve to progress from its standby condition to its normal operating condition is typically about 65 seconds. This interval may be adjusted by altering the charging time constant of capacitance 22.

In an NTSC type television system, field frequency is 60 per second. When used in an NTSC system, therefore, capacitance 26 is discharged and recharged 60 times per second. In addition, slope of the output voltage produced by integrator 33 during each vertical trace period becomes increasingly steep as timing circuit 42 draws less current from constant current generator 40, until the slope reaches a constant value when transistor 10 is driven essentially into nonconduction.

If the apparatus of FIG. 1, after having been operated, should be switched back into its standby condition, capacitance 22 discharges primarily through diode 23 and resistance 21 in series. The discharge time of capacitance 22 is determined essentially by the sizes of resistance 21 and capacitance 22, even though there exist parallel discharge paths through resistances 13, 20 and 21 in series, and through resistance 14, diode 15 and resistance 16 in series, since resistance 21 is relatively small. When switch 18 is once again actuated to its "operate" position, the vertical sweep will resume at a size depending upon the amplitude of voltage remaining on capacitance 22 assuming the voltage on capacitor 22 exceeds the voltage at the cathode of diode 15. Of course, if the switch 18 is in the standby position for a sufficient period to discharge capacitor 22, the voltage on this capacitor would be zero. Diode 23 and resistor 21 provide a fast reset for rapidly discharging capacitor 22.

FIG. 2 is a curve showing vertical sweep size as a typical function of time after the "operate" condition has been initiated in the circuitry of FIG. 1. From FIG. 2, it is evident that for about 2 units of time after the operate condition has been initiated, vertical sweep size is approximately 25% of its full value. Thereafter, vertical size begins to increase at a rate determined by the rate at which capacitance 22 in the circuity of FIG. 1 charges. After about 6.5 units of time following initiation of the operate condition, transistor 10 in the circuit of FIG. 1 is driven into nonconduction, at which time the entire collector current from transistor 11 is furnished to Miller integrator circuit 33. At that time, vertical sweep size reaches 100% of its full value.

In FIG. 3, apparatus for controlling the rate of horizontal sweep expansion within a light valve is illustrated. This apparatus comprises timing means 58 which includes a PNP transistor 50 with its base electrode connected to ground through a pair of series-connected resistances 51 and 52. A switch 53 furnishes positive bias, when in the operate condition, to the emitter electrode of transistor 50 through a resistance 59 and a potentiometer 54 in series, and to the cathode of a zener diode 55 having its anode connected to the junction of resistances 51 and 52. A controllable portion of potentiometer 54 is short-circuited. A capacitance 56 and resistance 57 are connected in series between the base electrode of transistor 50 and switch 53.

The collector electrode of transistor 50 is connected to the control grid of a vacuum tube 60, which may typically comprise a pentode, through a pair of coupling resistances 61 and 62 in series. The anode of a diode 63 is connected to the junction of resistances 61 and 62, while the cathode of diode 63 is grounded.

Horizontal sync pulses, applied to the primary winding of a transformer 65, are coupled to tube 60 through a diode 66 having its cathode connected to the anode of the tube while the anode of diode 66 is connected to one side of the transformer secondary. The opposite side of the transformer secondary is grounded. Charge storage means comprising an integrating capacitance 67 is connected between the anode of tube 60 and the anode of diode 63, while the suppressor grid of the tube is grounded. Thus tube 60 and capacitance 67 together comprise a Miller integrating circuit. Horizontal sweep pulses, appearing at the anode of tube 60, are furnished to the light valve horizontal deflection plates 68 for deflecting the light valve electron beam in the horizontal direction.

As long as switch 53 is in the "standby" position, transistor 50 is essentially nonconductive. At this time, horizontal sync pulses, which in the NTSC system occur at a frequency of 15,750 Hz, cause only enough current flow through a path comprising diode 66, capacitance 67 and diode 63, to maintain capacitance 67 fully charged. Initially, current from diode 66 also flows through tube 60. However, capacitance 67 is charged to its maximum value quickly, because resistance in the series charging path for the capacitance is kept low. Due to the polarities of diodes 63 and 66, the charge thus acquired by capacitance 67 is held almost constant during the interval between successive horizontal sync pulses, so that the amount of current required during each horizontal sync pulse to restore capacitance 67 to its fully charged condition is very slight. Additionally, tube 60 is driven into cutoff by the stored charge on capacitance 67, due to the negative bias thereby applied to the control grid of the tube.

When switch 53 is actuated to the operate position, zener diode 55 becomes back-biased, establishing a constant, predetermined positive potential at the junction of resistances 51 and 52. At the same time, current flow through resistance 57, capacitance 56, resistance 51 and resistance 52 in series produces a voltage across resistance 51 tending to bias the base of transistor 50 positive with respect to its emitter, and causes capacitance 56 to acquire a charge. At first, the base bias on transistor 50 is insufficient to produce full conduction of the transistor, so that tube 60 remains essentially nonconductive, with its control grid voltage held at negative cutoff potential, and capacitance 67 essentially retains its charge between horizontal sync pulses. Thus, sawtooth waves of but small amplitude differential are produced at the anode of tube 60 and, since these sawtooth waves constitute the horizontal sweep voltage of the light valve, they result in drastically shortened horizontal sweeps by the electron beam.

After a predetermined time interval, the charge on capacitance 56 has increased to a level where transistor 50 has acquired sufficient negative bias on its base, with respect to its emitter, to become slightly more conductive. This produces a small current flow through resistance 61, resistance 62, capacitance 67 and the anode-to-cathode path within tube 60, in series, thereby slightly biasing the control grid of tube 60 in a positive direction. Consequently, tube 60 is driven slightly into conduction, producing a more conductive discharge path or leakage path to ground for the voltage on capacitance 67 so that each time capacitance 67 is recharged by a pulse through diode 66, the charge can leak off, to a slightly greater extent each time, through tube 60. The effect of this charge leakage through tube 60 is to produce voltage waves at the anode of tube 60 which, between sync pulses, diminish in amplitude to progressively lower final values of voltage; that is, the horizontal sweep voltage excursions are produced between gradually increasing or widening amplitude limits. As these sawtooth waves increase in amplitude differential they produce increasingly larger horizontal sweeps.

As capacitance 56 continues to charge, less current flows through resistance 51. Consequently, transistor 50 is driven further into conduction, since its base voltage becomes less positive as it approaches the constant voltage at the junction of resistances 51 and 52. Accordingly, transistor 50 collector current increases, the anode of diode 63 becomes slightly less negative, and the charge on capacitance 67 is discharged at a more rapid rate between successive sync pulses. This causes a progressively greater change in voltage amplitude between initiation and termination of successive horizontal sweep pulses, which continues in the aforementioned manner until capacitance 56 becomes fully charged. At this time, transistor 50 collector current is at its steady state value, and capacitance 67 is thus discharged an equal amount through tube 60 during each trace interval. As a result, horizontal sweep pulses of maximum amplitude differential between initiation and termination are produced, yielding full horizontal sweep in the raster produced by the light valve.

FIG. 4 illustrates apparatus for controlling the rate at which intensity of the electron beam within the light valve is decreased from an initially high level to its normal operating value. This apparatus includes a comparator 90 which comprises first and second transistors 70 and 71, typically of the PNP type. Each emitter receives low positive bias through a common bias resistance 72 and a pair of emitter bias resistances 73 and 74 connected to the emitter electrodes of transistors 70 and 71, respectively. The collector electrode of transistor 70 is connected to a source of low negative potential.

Positive base bias is supplied to transistor 70 from a timing circuit 92 including a voltage divider network comprising resistances 86, 87 and 88 connected between a source of low positive voltage and ground, from the junction of resistances 86 and 87. Resistances 86 and 87 also function in combination as a collector load resistance for a transistor 75 of the PNP type in timing circuit 92. Base bias for transistor 75 is developed across a voltage divider comprising a resistance 77 in series with the parallel combination of a resistance 78 and capacitance 80, when connected between a high positive potential source and the low negative potential source. A switch 81 is connected in series with resistance 77 and applies high positive potential to resistance 77 only when in the operate position. When switch 81 is in the standby position, base bias for transistor 75 is furnished from the low negative potential source through resistance 78, as modified by whatever voltage is stored on capacitance 80 at that time. Negative emitter bias is furnished to transistor 75 from the low negative potential source through an emitter bias resistance 89. The cathode of a diode 82 is connected to the junction of resistances 87 and 88, while the anode of diode 82 is grounded.

An electron beam current sensor 83, responsive to intensity of electron beam current in the light valve, furnishes a signal to the base of transistor 71 through a stable, high gain DC amplifier 84 shunted by a feedback resistance 91. Sensor 83 may typically comprise a thin conductive film on which the light valve fluid layer is supported, connected to circuitry producing an output signal of amplitude proportional to the rate at which electrons impinge on the fluid layer, such as shown and described in Lee et al. U.S. Pat. No. 3,619,717, issued Nov. 9, 1971 and assigned to the instant assignee.

Collector bias for transistor 71 is furnished through a collector load resistance 85 from a source of high negative potential. The collector electrode of transistor 71 is connected to the grid electrode of the light valve electron gun 79 in order to control amplitude of electron beam current by controlling grid voltage. A typical electron gun for use in a light valve and having a grid to which a control voltage may be applied is described and claimed in B. A. Findeisen U.S. Pat. No. 3,587,901, issued June 22, 1971 and assigned to the instant assignee.

Although controlled electron beam initiation may be used in conjunction with either a vertical or horizontal sweep expansion rate, or both, in order to sweep excess fluid out of the raster area in the light valve so as to obtain a quiet mode raster for operation in minimal elapsed time subsequent to initiation of the operate condition of the apparatus, the description that ensues, for simplicity, is concerned only with controlling intensity of the electron beam.

During standby operation, the high positive voltage is not applied to resistance 77 since switch 81 is open. The base and emitter electrodes of transistor 75 at this time are both held at negative potential, so that the transistor is essentially nonconductive. This leaves a positive potential at the junction of resistances 86 and 87, essentially determined by resistances 86, 87 and 88 and voltage across the series combination thereof, which maintains transistor 70 at a predetermined level of conduction.

When the light valve is in the operate condition, the light valve anode is energized and an electron beam is produced in the light valve. Current sensor 83 controls base voltage of transistor 71 through amplifier 84 so as to adjust the voltage across collector load resistance 85 and thereby furnish a properly-selected voltage to the grid of light valve electron gun 79 so as to maintain electron beam intensity at the predetermined value. Thus sensor 83 acts in a negative feedback loop which includes transistor 71 and the grid of light valve electron 79 to maintain a proper level of electron beam current intensity. This level is selected by comparison of voltage on the base of transistor 71 with voltage on the base of transistor 70. Feedback resistance 91 determines amplitude of voltage supplied to the base of transistor 71 by converting current from sensor 83 into a voltage in the manner common to operational amplifiers and described in Korn and Korn, *Electronic Analog Computers*, Second Edition, McGraw-Hill, 1956, such as in Section 1.3. The circuitry of comparator 90 is selected so that, when the electron beam is first produced, electron beam current will be at an amplitude determined by collector voltage on transistor 71. Thus, for any given value of base voltage on transistor 71, collector current through transistor 71 controls light valve electron beam intensity since, as collector current increases, electron beam intensity increases, and vice-versa. Any increase in electron beam intensity, however, tends to produce a positive-going increase in base voltage on transistor 71, thereby reducing transistor 71 collector current so as to reduce electron beam intensity. The negative feedback signal thus furnished to the grid electrode of light valve electron gun 79 by transistor 71 and its associated collector load resistance 85 tends to stabilize electron beam intensity at a level depending upon size of resistance 85 and emitter-to-collector current flow through transistor 71.

Emitter-to-collector current flow through transistor 71 is dependent, in part, on amplitude of emitter voltage on transistor 71 which, in turn, depends on voltage at the junction of resistances 72, 73 and 74. Since transistor 70 draws emitter current through resistances 72 and 73, voltage at the junction of these resistances is dependent upon transistor 70 emitter current amplitude which is controlled by base voltage amplitude on transistor 70. Additionally, comparator 90 requires that base voltage on transistor 71 be substantially equal to base voltage on transistor 70, since transistors 70 and 71 are selected to be of identical types which exhibit substantially identical parameters, resistances 73 and 74 are selected to be of essentially the same sizes, and the range of voltage drop across collector load resistance 85 is selected to provide transistor 71 with a collector voltage that approximates the grid operating voltage of the light valve gun 79.

The light valve electron beam current intensity is directly proporational to base voltage on transistor 70. Specifically, any increase in transistor 70 emitter current increases the voltage drop across resistance 72, thereby lowering emitter-to-collector voltage across transistor 71 and decreasing the voltage drop across collector load resistance 85 so as to reduce light valve electron beam current by driving the grid of light valve electron gun 79 in a negative direction. Similarly, any decrease in transistor 70 emitter current tends to increase light valve electron beam current. Accordingly, if the positive base voltage on transistor 70 should be decreased by a given amount, light valve electron beam current will decrease proportionately.

During standby operation, as previously mentioned, switch 81 is open and transistor 75 is essentially nonconductive. This leaves transistor 70 in relatively light conduction due to the relatively high voltage applied to its base from the junction of resistances 86 and 87. Consequently, transistor 71 is in conduction and there is minimal voltage drop across resistance 85, biasing the grid of light valve electron gun 79 less negative than its steady state operating voltage.

Thereafter, when switch 81 is actuated to its operate position, capacitance 80 in timing circuit 92 begins to charge at a rate determined by amplitude of positive voltage supplied through switch 81 and by the sizes of resistances 77 and 78 and capacitance 80. As charge on capacitance 80 increases, base voltage on transistor 75 becomes increasingly positive, causing the transistor to draw collector current through resistors 86 and 87 and finally also through diode 82 in shunt with resistance 88. As transistor 75 draws increasing collector current, voltage at the junction of resistances 86 and 87 decreases, and hence on the base of transistor 70. As positive base voltage on transistor 70 decreases, a proportional decrease in electron beam current intensity occurs. When sufficient current is drawn through diode 82 to achieve essentially a constant forward voltage drop thereacross even as diode current may increase further, no further decrease in voltage occurs at the junction of resistances 87 and 88; thereafter, electron beam current in the light valve remains regulated at a constant value. Diode 82 thus acts as a clamp to keep the collector of transistor 75 from going negative and holds the voltage at the junction of resistors 86 and 87 constant.

Base voltage on transistor 75 stabilizes when the voltage amplitude on capacitance 80 equals that of the high positive voltage source. Thus it is evident that when switch 81 is actuated to its operate position, electron beam intensity initially exceeds the required final intensity, and is gradually reduced from its high initial value to its required final value over a predetermined period of time and at a predetermined rate, as controlled by timing circuit 92. Typically, the electron beam may be initiated at about a 9.5 microamp intensity which gradually decreases to 4.8 microamps over a 12 microsecond period, in conjunction with a raster that is gradually expanding in both vertical and horizontal sizes at predetermined rates in the manner described, supra.

FIG. 5 is a graphical illustration of a typical light valve electron beam intensity change upon initiation of the operate condition at time zero. In 12 microseconds, electron beam current settles smoothly from an initial amplitude of about 9.5 microamps to a constant operating value of 4.5 microamps. Different rates of change in beam current during the initial 12 microseconds of the operate condition can be obtained, if desired, by selecting different sizes for capacitance 80 and resistances 77, 78, 86, 87 and 88, shown in FIG. 4. The parameters of elapsed time to reach constant operating electron beam current, initial amplitude of electron beam current, and slope of the electron beam current curve between initiation of the operate condition and attainment of constant operating electron beam current, are preferably selected in conjunction with the vertical or horizontal sweep expansion rate, or both, to achieve the shortest elapsed time to a normal raster on a nonturbulent light-modulating fluid medium. If electron beam current intensity is controlled independently of raster size, a different curve than that shown in FIG. 5 may be selected to achieve the shortest elapsed time to a normal raster on a nonturbulent light-modulating fluid medium.

The preceding description treats expansion of horizontal sweep size, expansion of vertical sweep size, and decreasing electron beam intensity, for simplicity of explanation, as separate and distinct operations for achieving a nonturbulent condition of the light-modulating medium. Those skilled in the art will recognize, however, that each of these operations may be performed in combination with either or both of the other two operations in order to optimize early overall performance of the light valve.

The foregoing describes a fluid light valve having a shortened interval between the time when the light valve electron beam is first turned on and the time when high quality images may first be displayed by the light valve. A method and apparatus are described for controllably expanding vertical sweep size, horizontal sweep size, and both horizontal and vertical sweep sizes of the raster in a fluid light valve from the time the light valve electron beam is turned on, in order to establish a smooth and uniform fluid surface quickly over the total raster area. A method and apparatus are also described for controllably altering electron beam current in a fluid light valve independently, or in conjunction with controllably expanding sweep size of the raster, from the time the light valve electron beam is turned on, in order to establish a smooth and uniform fluid surface quickly over the total raster area.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. In an optical projection system wherein an electron beam is deflected in accordance with a signal to impinge in a raster over the surface of a light-modulating fluid medium, apparatus for controlling the charge deposited by said electron beam on said medium during an initial start-up period, comprising:

electron beam generating means, and means coupled to said electron beam generating means for altering electron beam current to control the charge density throughout said raster so as to sweep out excess fluid from the raster area until said medium reaches operating condition.

2. The apparatus of claim 1 wherein said means coupled to said electron beam generating means comprises:

comparator means having an output and first and second inputs;

electron beam sensing means coupled to the first input of said comparator means, said electron beam sensing means producing a signal in accordance with intensity of said electron beam; and timing means coupled to the second input of said comparator means, said timing means producing a time varying signal of predetermined characteristics upon initiation of said electron beam, said output of said comparator means being coupled to said electron beam generating means for adjusting amplitude of electron beam current in accordance with any difference in signals produced by said electron beam sensing means and said timing means.

3. In an optical projection system wherein an electron beam impinges on a light-modulating fluid medium, said electron beam being deflected over the surface of said medium in raster fashion in accordance with a signal so as to control light energy directed upon said medium, apparatus for quieting turbulence of said medium so as to render said surface uniformly calm and smooth, comprising:

electron beam generating means for generating said beam with controllable intensity; and means coupled to said electron beam generating means for decreasing electron beam current at a controlled time rate from an initial higher intensity level to a predetermined operating level.

4. The apparatus of claim 3 wherein said means coupled to said electron beam generating means comprises:

comparator means having an output and first and second inputs;

electron beam sensing means coupled to the first input of said comparator means, said electron beam sensing means producing a signal in accordance with intensity of said electron beam; and timing means coupled to the second input of said comparator means, said timing means producing a time varying signal of predetermined characteristics upon initiation of said electron beam, said output of said comparator means being coupled to said electron beam generating means for adjusting amplitude of electron beam current in accordance with any difference in signals produced by said electron beam sensing means and said timing means.

5. In an optical projection system wherein an electron beam impinges on a light-modulating fluid medium, said electron beam being deflected over the surface of said medium in accordance with a signal so as to control light energy directed upon said medium, apparatus for quieting turbulence of said medium so as to render said surface uniformly calm and smooth, comprising:

electron beam deflection means for sweeping said beam over said medium in a raster of size controllable between a predetermined operating size and an initial size smaller than said predetermined operating size; and means coupled to said electron beam deflection means for expanding said raster from said initial size at a controlled time rate by enlarging the sweep of said beam at said controlled time rate until said raster has increased to said predetermined operating size.

6. The apparatus of claim 5 wherein said means coupled to said electron beam deflection means comprises means for producing vertical sweep voltage excursions between gradually widening amplitude limits.

7. The apparatus of claim 5 wherein said means coupled to said electron beam deflection means comprises means for producing horizontal sweep voltage excursions between gradually widening amplitude limits.

8. The apparatus of claim 6 including additional means for producing horizontal sweep voltage excursions between gradually widening amplitude limits.

9. The apparatus of claim 6 including electron beam generating means for generating said beam with controllable intensity, and means coupled to said electron beam generating means for decreasing electron beam current at a controlled time rate while the amplitude limits of said vertical sweep voltage excursions are gradually widening.

10. The apparatus of claim 7 including electron beam generating means for generating said beam with controllable intensity, and means coupled to said electron beam generating means for decreasing electron beam current at a controlled time rate while the amplitude limits of said horizontal sweep voltage excursions are gradually widening.

11. THe apparatus of claim 8 including electron beam generating means for generating said beam with controllable intensity, and means coupled to said electron beam generating means for decreasing electron beam current at a controlled time rate while the amplitude limits of each of said vertical and horizontal sweep voltage excursions are gradually widening.

12. The apparatus of claim 6 wherein said means for producing vertical sweep voltage excursions between gradually increasing amplitude limits comprises:

an integrator circuit;

constant current generator means having an output coupled to the input of said integrator circuit so as to furnish current to said integrator circuit; and timing means coupled to the output of said constant current generator means, said timing means gradually receiving less current from said constant current generator means so as to gradually divert more current to said integrator circuit and thereby permit said integrator circuit to produce vertical sweep voltage excursions between said gradually increasing amplitude limits.

13. The apparatus of claim 7 wherein said means for producing horizontal sweep voltage excursions between gradually increasing amplitude limits comprises:

charge storage means;

means coupled to said charge storage means for supplying charge pulses thereto at a constant frequency;

circuit means coupled to said charge storage means for controllably supplying a leakage path for said charge storage means; and timing means coupled to said circuit means for gradually increasing conductivity of said circuit means to permit horizontal sweep voltage excursions on said charge storage means between said gradually widening amplitude limits.

14. In an optical projection system wherein an electron beam is deflected to impinge in a raster over the surface of a light-modulating fluid medium, a method for sweeping out excess fluid from said raster area with minimum delay during an initial start-up period, comprising:
establishing a control signal varying at a predetermined rate, and
altering flow of said electron beam toward said medium under control of said control signal to adjust the charge density throughout said raster until said medium reaches operating condition.

15. The method of claim 14 wherein the step of altering said electron beam comprises increasing, at a controlled time rate, the area of said surface over which said electron beam is deflected.

16. The method of claim 14 wherein the step of altering said electron beam comprises increasing, at a controlled time rate, the distance over which said electron beam is deflected vertically.

17. The method of claim 14 wherein the step of altering said electron beam comprises increasing, at a controlled time rate, the distance over which said electron beam is deflected horizontally.

18. The method of claim 14 wherein the step of altering said electron beam comprises increasing, at separately determined time rates, the horizontal and vertical distances, respectively, over which said electron beam is deflected.

19. The method of claim 14 wherein the step of altering said electron beam comprises decreasing to a predetermined operating level, at a controlled time rate, the intensity of said electron beam.

20. The method of claim 15 including the step of decreasing electron beam current, at a controlled time rate, to a predetermined operating level.

21. In an optical projection system wherein an electron beam is deflected in accordance with a signal to impinge in a raster over the surface of a light-modulating fluid medium, apparatus for controlling the charge deposited by said electron beam on said medium during an initial start-up period, comprising:
electron beam generating and deflecting means, and
means coupled to said electron beam generating and deflecting means for altering electron beam flow toward said medium to control the charge density throughout said raster, thereby sweeping out excess fluid from the raster area until said medium reaches operating condition.

22. The apparatus of claim 21 wherein said means alters electron beam current to decrease charge density from an initial high value to the value required for normal operation.

23. The apparatus of claim 21 wherein said means alters said signal to increase the size of said raster from an initial small size to the size required for normal operation.

24. The apparatus of claim 21 wherein said means alters electron beam current and alters said signal to decrease the charge density throughout said raster from an initial value to a predetermined operating value.

* * * * *